Patented June 19, 1951

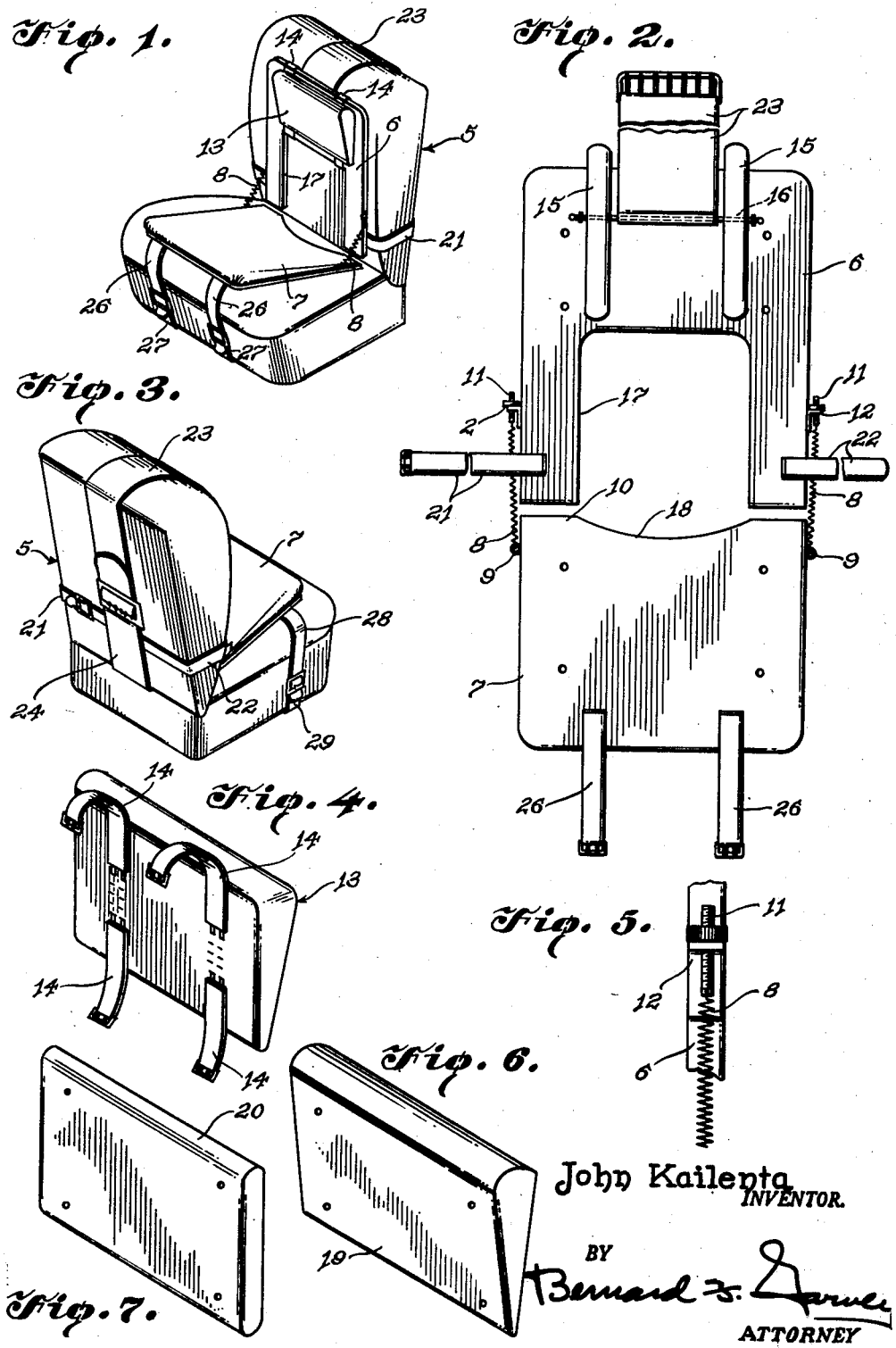

2,557,874

UNITED STATES PATENT OFFICE 2,557,874

POSTURE AID SEAT

John Kailenta, Staten Island, N. Y.

Application November 22, 1946, Serial No. 711,697

2 Claims. (Cl. 155—131)

This invention relates to a seat and backrest assembly for use in supplementing the supporting action of automobile seats, chairs and the like.

Particularly it is an object of the present invention to provide for use in conjunction with upholstered seats, and especially automobile seats, a seat and backrest assembly as will closely follow the principles of posture sitting.

My invention is based on the premise that much harm is incurred by drivers of automobiles and others, whose occupation requires similar functions, as a result of the position which the body tends to assume due to the overstuffed upholstery now employed in automobiles.

Close observation has convinced me that most car drivers are subject to cramped and harmful posture. As the operator of the vehicle sinks into the upholstered seat, the weight of the body tends to center on a small area of the buttocks around the anus and region of the lower spine. This harmful position is also aggravated by the driver's constant use of his feet and legs. Furthermore, in hot weather, perspiration tends to be the greatest in the area of the buttocks and around the anus and region of the lower spine, causing inflammation and discomfort. The anus tends to spread, pains in the lower back become prevalent, and in addition, the leverage of the legs is reduced because the lower part of the back receives the most pressure. Furthermore, the abdomen is pushed into a cramped position obstructing a free movement of the digestive organs.

The seat and backrest assembly embodying the features of the present invention functions as a cushioning support, affording comfort to the occupant as it tends to hold the back and spine in proper restful position and in such relation to the automobile seat as to permit necessary and desirable ventilation.

The invention together with its objects and advantages will be best understood by reading the following detailed description with reference to the accompanying drawings:

Figure 1 is a front perspective view of an upholstered automobile seat and illustrating the application of my posture aid thereto;

Figure 2 is a rear or bottom plan view of the posture aid assembly in a fully extended condition;

Figure 3 is a rear perspective view of an upholstered automobile seat, further illustrating the application of the invention;

Figure 4 is a perspective view of a supporting pad forming part of the invention;

Figure 5 is a fragmentary detail elevational view of a tension-adjustable connection between the backrest and seat, forming part of my invention;

Figure 6 is a perspective view of a spacer member for the backrest; and

Figure 7 is a perspective view of a spacer member for the seat forming part of the invention.

In accordance with my invention, there is provided for use in conjunction with an automobile seat or like upholstered article of furniture 5, a posture aid comprising a rigid backrest 6 and a rigid seat member 7.

The backrest 6 and the seat member 7 may each be formed of wood, metal, plastic or any other suitable material, and are adapted to fold one upon the other. Also members 6 and 7 are elastically connected together so as to permit such folding, and also so as to permit either member to be adjusted in practically any direction relative to, and independently of, the other member. Thus, as shown, such elastic connection is in the form of a pair of coil springs 8—8. In the present instance, the springs 8—8 are anchored at one end as at 9—9, to opposite side edges of the seat 7 adjacent the rear edge 10 of the latter. The free ends of the springs 8—8 are secured to the vertical edges of the backrest 6 through the medium of tension-adjusting screw and nut assemblies 11—11, and complemental brackets 12—12. It will be apparent that a quick and positive adjustment of the tension of springs 8 may be effected whenever found desirable.

For supporting the shoulders and upper body portion of the occupant of the seat 5 in a comfortable position, there is provided a pad 13 (Figure 4). The pad 13 may be of any suitable construction, but preferably is wedge-shaped in end elevation as illustrated. This pad is adapted to be applied to the front of the backrest 6 at the upper portion of the latter for the purpose just stated. The pad 13 is removably secured to the backrest 6 through the medium of buckle-equipped straps 14 with which the pad 13 is equipped, and which complement fastening straps 15 secured respectively intermediate their respective ends to the rear side of the backrest 6. In this connection it will be noted that for illustrative purposes only, I have shown the straps 15 secured to the backrest 6 through the medium of a rod 16 that is passed through intermediate tubular portions or hems formed in the straps 15, and secured in any positive manner at its respective opposite ends to the backrest 6. Manifestly, by securing the upper ends of the straps 15 to the upper pair of straps 14, and the lower ends of the straps 15 to the lower pair of straps 14, pad 13 is positively secured at the desired position of vertical adjustment on the backrest 6 at the front side of the latter, or in other words, in substantially the position shown in Figure 1.

In actual practice, it will be found that the pad 13 aids not only in diverting most of the stress and pressure from the lower regions of the back to the shoulder regions of the back where the muscles are larger and more sinewy, but enables the user to obtain better leverage for the performance of such foot and leg functions as are required in the operation of an automobile.

My seat and backrest is further characterized by having the backrest 6 provided in the lower portion thereof, with a vertical notch 17 complemented by an arcuate notch 18 provided in the rear edge 19 of the seat 7. These complemental notches 17, 18 make provision for relieving the pressure at the lower portion of the body of the user. At the same time, by having the backrest 6 provided with the vertical notch 17, provision is made for permitting cushioned support for the lower portion of the body of the occupant, such cushioned support being provided either by the exposed area of the upholstered back of the seat 5 or by a cushion (not shown) which may be readily positioned on the backrest 6 in the area of the notch 17.

When it is desired to support the backrest 6 forwardly with respect to the back proper of the seat 5, resort may be had to a spacer block (Figure 6) indicated by the reference numeral 19. This block may be formed of any suitable lightweight material, e. g. wood. Also the block 19 is preferably wedge-shaped in end elevation for best results.

When the spacer block 19 is to be used, the same may be readily applied to the upper portion of the backrest 6 at the rear of the latter for interposition between the backrest and the back of the seat 5. Screws or any other suitable fastening means may be employed for securing the spacer block 19 in fixed position on the backrest 6.

Whenever it is desired to raise the seat 7 of the posture aid with respect to the seat proper of the upholstered seat 5, resort may be had to a spacer block such as shown in Figure 7 and indicated by the reference numeral 20. Block 20 is preferably formed of wood or other suitable light material and, as shown, may be substantially rectangular and of uniform thickness. This block 20 may be readily inserted between the underside of the seat 7 and the top surface of the seat portion of the upholstered seat 5, and when desired screws or other suitable fastening elements may be resorted to for positively securing spacer block 20 to the underside of seat 7.

Through the medium of the blocks 19 and 20, and particularly the block 19, the lower portion of the back of the occupant may be so spaced from the back of the seat 5 as to insure maximum ventilation, and as will be found desirable when the weather is warm or hot, so as to reduce perspiration at the lower region of the back and at the buttocks to a minimum.

The posture aid as just described may be secured at the desired position of adjustment on the seat 5 in any suitable manner. However, by way of illustration, I have shown the backrest 6 to be provided with complemental strap sections 21, 22 secured to and extending from opposite sides of the backrest 6. These straps, as shown to advantage in Figures 1 and 3, are adapted to be passed to the rear of the back of the seat 5 and buckled together.

Also the backrest 6 has secured to the rear thereof and adjacent its upper edge, a relatively wide buckle-equipped strap 23. This strap 23 is secured at one end to the backrest 6 through the medium of the aforementioned rod 16 and as shown to advantage in Figure 2.

To complement the strap 23, the seat 5 is provided with a strap 24. Manifestly, by passing the strap 23 over the top of the back of seat 5 and buckling it to strap 24, backrest 6 will be secured in position against vertical displacement.

Seat 7 of the posture aid is also provided with straps complemental to straps with which seat 5 is provided to secure seat 7 in fixed position. As shown in Figures 1 and 2, the straps of seat 7, and therein indicated by the reference numerals 26—26, may be secured to the underside of seat 7 adjacent the front or forward edge thereof and complement strap sections 27—27 provided at the base of the seat 5 and at the front of the latter. As an alternative to, or in addition to, straps 26, seat 7 may be provided with lateral straps 28 adapted to be buckled or otherwise fastened to straps 29 secured at opposite sides of the seat 5 adjacent the base of the latter, and as shown to advantage in Figure 3.

From the foregoing it will be seen that the device of this invention will serve to prevent "slumping" and cause the occupant to assume an erect position with consequent material decrease in fatigue and increased driving comfort.

Other advantages of the invention are, an increase in the life of the automobile seat, since with the use of my device the weight of the occupant is more evenly distributed on the inner springs of the upholstered seat and at the same time, the upholstery is protected from wear; the posture aid can be installed and effectively used regardless of the deteriorated condition of the upholstered seat; and since the device follows closely the principles of posture sitting, greater attentiveness on the part of the driver of the vehicle should result.

While I have herein described a preferred embodiment of my invention, nevertheless it is to be understood that various changes may be made in the invention, within the scope of the appended claims.

What I claim is:

1. A posture aid for use in conjunction with an automobile seat or the like, comprising a rigid seat and a rigid backrest adapted to fold one upon the other, springs connecting the seat and backrest together, a pad, said springs having tension-adjusting means mounted thereon, interengaging means on the backrest and on the pad for securing the latter to the upper portion of the former, and the lower portion of the backrest and the rear edge of the seat being complementarily notched to permit use of the area of the automobile seat exposed thereby or of an additional cushion, optionally, as a support for the lower portion of the body of the occupant.

2. A posture aid for automobile seats and the like, comprising a rigid seat and a rigid backrest elastically connected together, the lower portion of the backrest and the rear edge of the seat being complementarily notched to relieve pressure at the lower portion of the body of the user, and means on the back rest and on the seat and engageable with the automobile seat to secure the mentioned backrest and seat thereon against displacement.

JOHN KAILENTA.

REFERENCES CITED

The following references are of record in the file of this patent:

UNITED STATES PATENTS

| Number | Name | Date |
|---|---|---|
| 633,012 | Kidd | Sept. 12, 1899 |
| 645,878 | Tennyson | Mar. 20, 1900 |
| 1,784,021 | Michelson | Dec. 9, 1930 |
| 1,982,516 | Holmestead | Mar. 27, 1934 |

FOREIGN PATENTS

| Number | Country | Date |
|---|---|---|
| 6,362 | Great Britain | 1894 |
| 514,570 | Great Britain | 1939 |